United States Patent [19]
Chiba et al.

[11] Patent Number: 5,714,743
[45] Date of Patent: Feb. 3, 1998

[54] CARD AND CARD ISSUING APPARATUS

[75] Inventors: Hiromi Chiba; Hiroshi Sasou; Shuichirou Tanaka, all of Tokyo, Japan

[73] Assignee: Tamura Electric Works, Ltd., Japan

[21] Appl. No.: 619,177

[22] Filed: Mar. 21, 1996

[30]  Foreign Application Priority Data

Mar. 28, 1995  [JP]  Japan ................... 7-069312

[51] Int. Cl.$^6$ ............................................. G06K 7/08
[52] U.S. Cl. .................... 235/449; 235/379; 235/384; 235/487; 235/493
[58] Field of Search .................. 235/379, 375, 235/384, 487, 493, 449

[56]  References Cited

U.S. PATENT DOCUMENTS

| | | | |
|---|---|---|---|
| 3,501,622 | 3/1970 | Weir et al. | 235/384 |
| 3,859,507 | 1/1975 | Konya | 235/384 |
| 3,949,363 | 4/1976 | Holm | 235/437 |
| 3,958,103 | 5/1976 | Oka et al. | 235/384 |
| 3,984,660 | 10/1976 | Oka et al. | 235/384 |
| 4,288,688 | 9/1981 | Kiyama et al. | 235/384 |
| 5,397,623 | 3/1995 | Christy et al. | 235/493 |
| 5,406,068 | 4/1995 | Nusbaum | 235/493 |
| 5,421,463 | 6/1995 | Okazaki et al. | |
| 5,461,219 | 10/1995 | Cronvall | 235/375 |

FOREIGN PATENT DOCUMENTS 6-75052  10/1994  Japan.

*Primary Examiner*—Harold Pitts
*Attorney, Agent, or Firm*—Samuels, Gauthier, Stevens & Reppert

[57]  ABSTRACT

A card includes a magnetic track portion on which value information representing a prepaid amount and one of serial number data consecutively assigned in an issuance order are magnetically recorded, and a serial number printing portion in which a number representing the serial number data is marked with a laser beam. A card issuing apparatus includes a recording/reproducing unit and a laser marking unit. The recording/reproducing unit magnetically records value information representing a prepaid amount and one of serial number data consecutively assigned in an issuance order in a first area of the card, and reads out the serial number data magnetically recorded in the first area. The laser marking unit marks a number represented by the serial number data read out by the recording/reproducing unit in a second area of the card with a laser beam.

5 Claims, 5 Drawing Sheets

5,714,743

CARD AND CARD ISSUING APPARATUS

BACKGROUND OF THE INVENTION

The present invention relates to a card on which a bar code representing a unique serial number is printed and information is magnetically recorded, and a card issuing apparatus for issuing this card.

A bar code area is generally formed on the lower surface of a card such as a public telephone prepaid card on which value information representing a prepaid amount is recorded on a magnetic track. Bar codes representing unique serial numbers different from each other are printed on the bar code areas of cards, respectively. For example, when the value information of a card is destroyed, the card is managed in accordance with the information represented by the corresponding bar code.

FIG. 5 shows an example showing the lower surface of such a card. Reference numeral 1 denotes a card; 11a and 11b, magnetic tracks formed on the lower surface of the card 1 and magnetically recorded with value information and the like; and 12, a bar code area in which bar code information is printed. The bar code area 12 has a bar code portion 12a in which a bar code is printed and a number portion 12b in which the bar code is printed in number.

When this card 1 is supplies as a nonrecorded card, value information is recorded in a predetermined area of the magnetic tracks 11a and 11b. The bar code is then read from the bar code area 12, and data representing the bar code is magnetically recorded in an area different from the value information recording area of the magnetic tracks 11a and 11b, thereby issuing the card.

The operation of a card issuing apparatus for issuing such a card will be described with reference to a flow chart in FIG. 6. The card issuing apparatus receives a nonrecorded card supplied thereto (step S61) and reads the bar code printed on this card (step S62). The card issuing apparatus then checks if an error is present in the read bar code data (step S63). If NO in step S63, the card issuing apparatus magnetically records card data consisting of the value information and the read bar code data in a predetermined area of the magnetic tracks 11a and 11b (step S64).

The card issuing apparatus then reads out the magnetically recorded card data from the magnetic tracks 11a and 11b (step S65) to determine whether the readout bar code data coincides with the written bar code data (step S66). If YES in step S66, the magnetically recorded card 1 is sorted as a normal card. However, if NO in step S66, the card 1 is sorted as an abnormal card (step S68). Note that when a read error occurs in reading the bar code from the bar code area 12, the card 1 is sorted as an abnormal card (step S68).

In the conventional card 1 described above, since the bar code is printed by an ink-jet printer, the printout becomes scratchy or tends to blot. The read error frequently occurs in reading the cards by the card issuing apparatus to reduce the yield in card issuance. Defective cards having read errors cause missing numbers in the serial numbers to make it difficult to manage the cards.

SUMMARY OF THE INVENTION

It is an object of the present invention to provide cards assigned with serial numbers free from missing numbers by increasing the yield in card issuance, and a card issuing apparatus for issuing these cards.

In order to achieve the above object of the present invention, there is provided a card comprising a magnetic track portion on which value information representing a prepaid amount and one of serial number data consecutively assigned in an issuance order are magnetically recorded, and a serial number printing portion in which a number representing the serial number data is marked with a laser beam.

DESCRIPTION OF THE PREFERRED EMBODIMENT

The present invention will be described with reference to the accompanying drawings.

Figure 4:
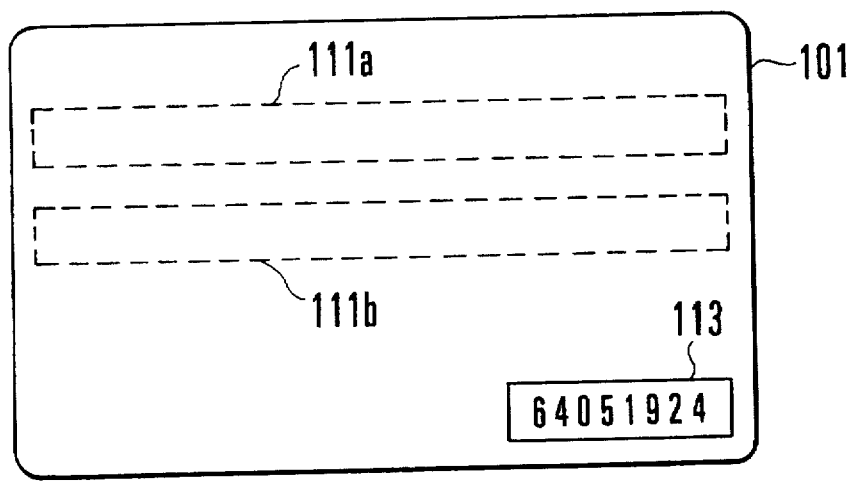
FIG. 4 is a plan view showing the lower surface of a card of the present invention.
Figure 5:
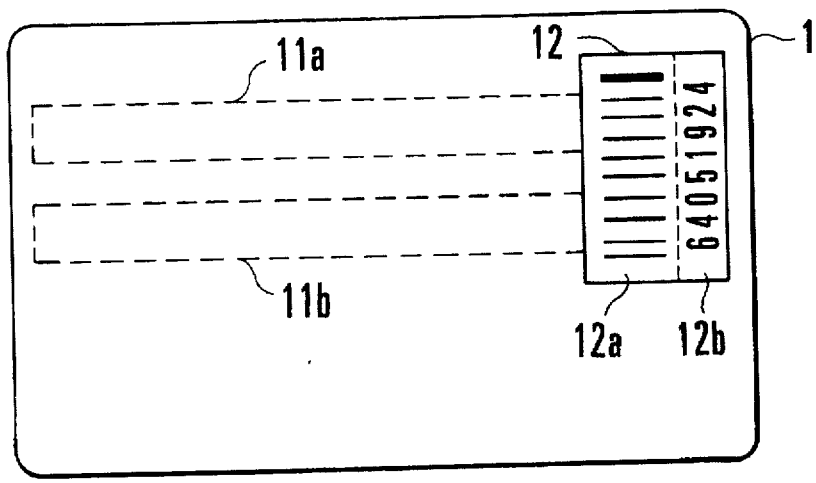
FIG. 5 is a plan view showing the lower surface of a conventional card.
Figure 6:
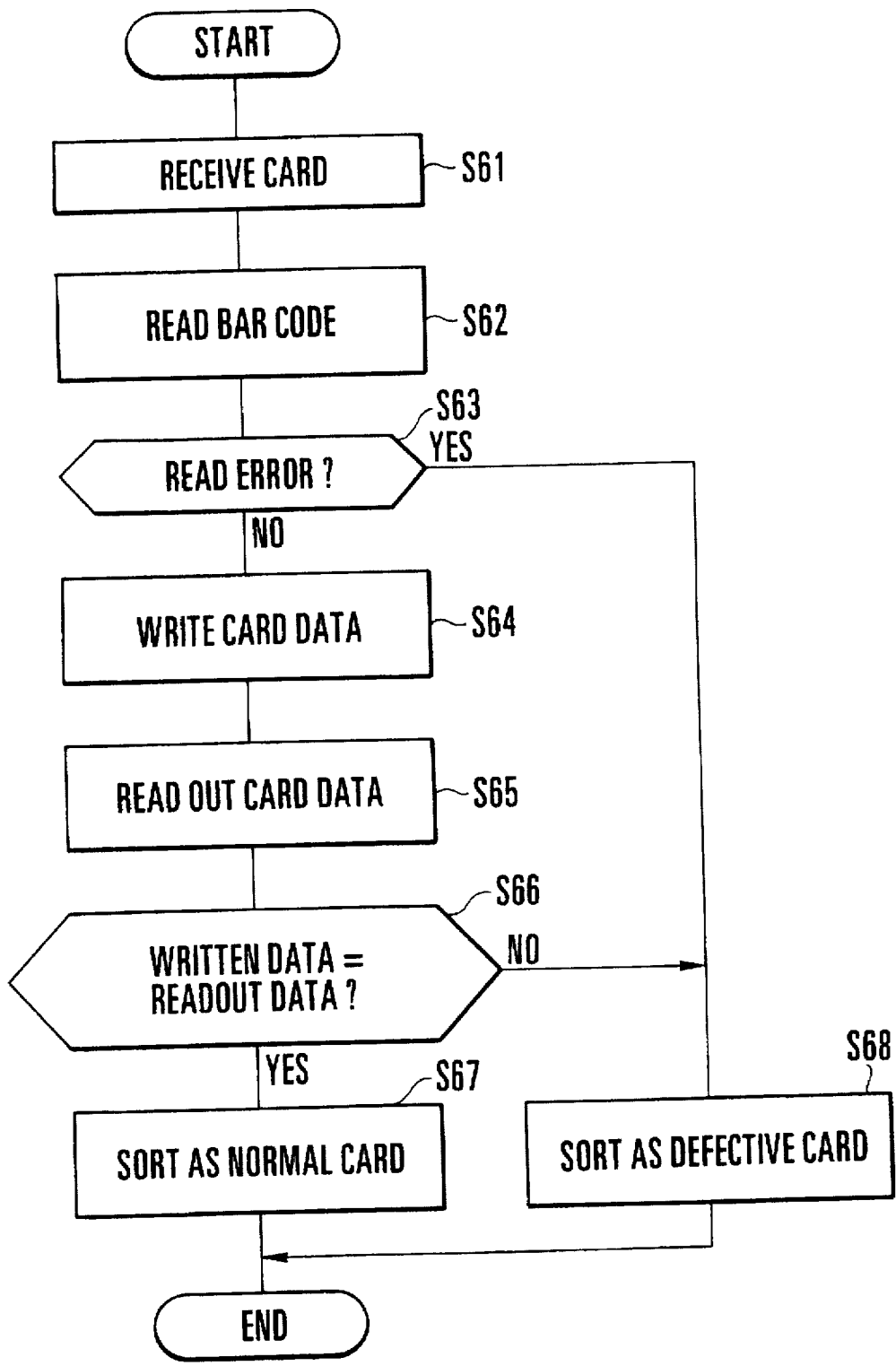
FIG. 6 is a flow chart showing conventional card issuing processing.

FIG. 4 shows the lower surface of a card according to the present invention. Reference numeral 101 denotes a card. Magnetic tracks 111a and 111b for recording card data consisting of number codes including value information and a serial number which are assigned to the card 101 are formed on the lower surface of the card 101. A number code printing portion (serial number printing portion) 113 in which a number code identical to a magnetically recorded number code is formed parallel to the magnetic tracks 111a and 111b at a position separated from the magnetic tracks 111a and 111b. The number code including the serial number is marked in the number code printing portion 113 by a laser marking unit in a card issuing apparatus (to be described later).

Figure 1:
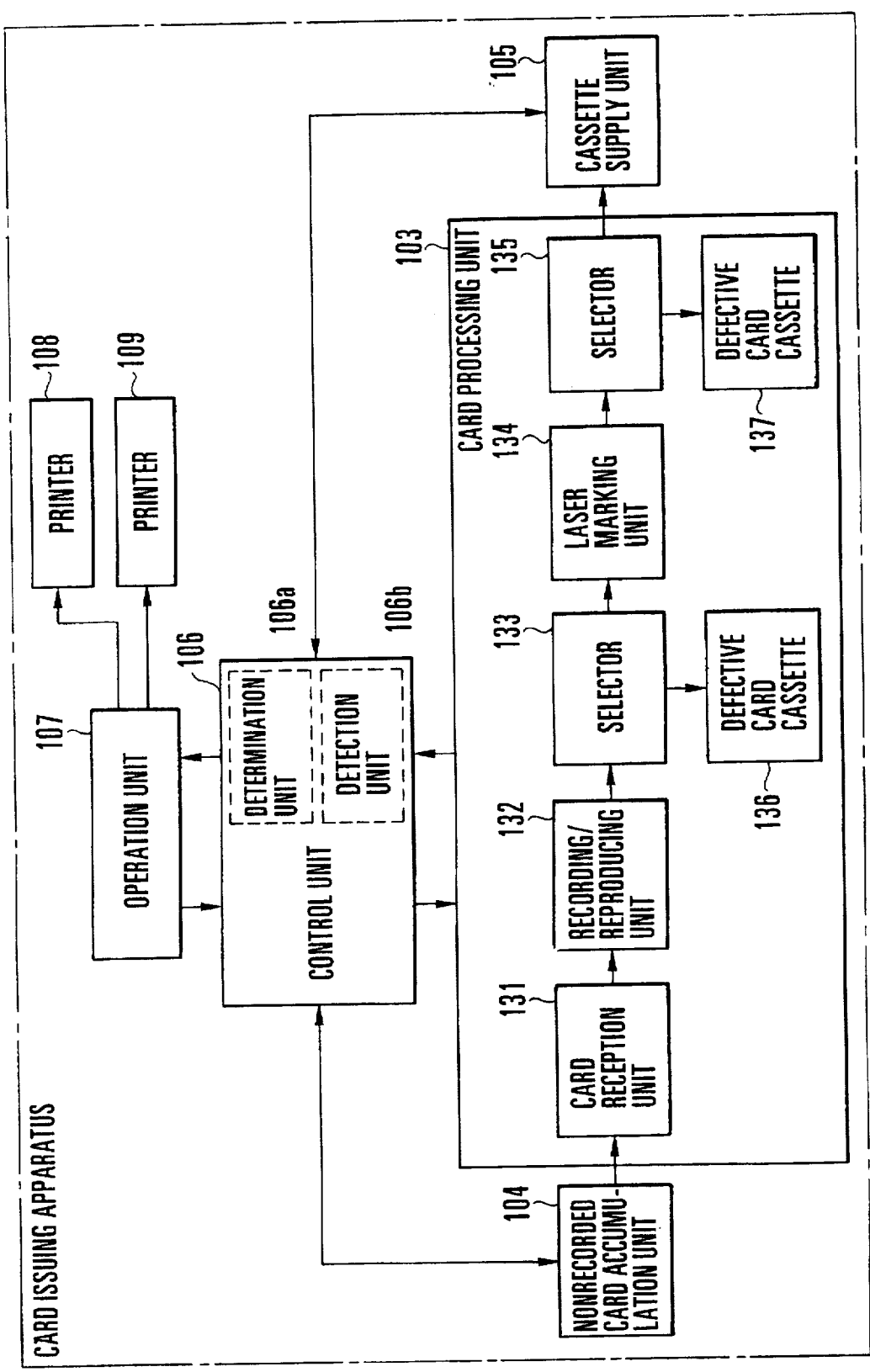
FIG. 1 is a block diagram showing a card issuing apparatus according to an embodiment of the present invention.

FIG. 1 shows the card issuing apparatus for marking the number code on the card 101 shown in FIG. 4. Reference numeral 102 denotes a card issuing apparatus. The card issuing apparatus 102 comprises a card processing unit 103 for performing card issuing processing, a nonrecorded card accumulation unit 104 for accumulating nonrecorded cards each having the magnetic tracks 111a and 111b upon card supply from a card manufacturing company, a cassette supply unit 105 for accumulating the issued cards, a control unit 106 for controlling the overall card issuing processing, an operation unit 107 having a personal computer for inputting various pieces of information, and printers 108 and 109. The control unit 106 comprises a determination unit 106a for determining whether the readout data coincides with the data written on the card 101 by a recording/reproducing unit (to be described later), and a detection unit 106b for causing a plurality of optical sensors (not shown) to detect a card jam in a path from a laser marking unit (to be described later) to the cassette supply unit 105.

The card processing unit 103 comprises a card reception unit 131 for sequentially receiving the accumulated nonrecorded cards, a recording/reproducing unit 132 for recording/reproducing information with respect to the received card, selectors 133 and 135 for sorting the information-recorded cards in accordance with nondefective/defective card information from the control unit 106, a laser marking unit 134 for marking a number code including a serial number on the card using a laser beam, and defective card cassettes 136 and 137 for accumulating the defective cards sorted by the selectors 133 and 135.

In the card processing unit 103 having the above arrangement, the card reception unit 131 receives the nonrecorded cards from the nonrecorded card accumulation unit 104 one by one. Card data consisting of value information and the number code including the serial number is magnetically recorded on the magnetic tracks 111a and 111b of each received nonrecorded card by the recording/reproducing unit 132. The recording/reproducing unit 132 reads out the card data recorded on the card. The determination unit 106a in the control unit 106 determines whether the number code of the readout card data coincides with the written number code, thereby checking if the magnetically recorded information is valid. A defective card determined not to be undergone normal magnetic recording is sorted to the defective card cassette 136 by the selector 133 driven and controlled by the control unit 106. In contrast to this, a nondefective card determined as a normal card is supplied to the laser marking unit 134 through the selector 133. The same number code as the magnetically recorded number code is marked in the number code printing portion 113 of the card 101 shown in FIG. 4.

The card marked with the number code is delivered as a normal card to the cassette supply unit 105 through the selector 135 unless the card jam does not occur in a card convey path (not shown) in the card processing unit 103. However, when the detection unit 106b detects the card jam in the card convey path, predetermined card jam elimination processing is performed, and the card is delivered as a defective card to the defective card cassette 137 under the control of the control unit 106.

As described above, card issuing processing of the card processing unit 103 is performed under the control of the control unit 106 in accordance with information supplied from the operation unit 107. In card issuing mode, the printer 108 prints issuance journal information such as the number of cards to be issued, the number of nondefective cards, the number of defective cards, and date of card issuance. The printer 109 prints a label for each lot of issued cards. The range of number codes of the issued cards included in each lot is recorded in the corresponding label.

Figure 2:
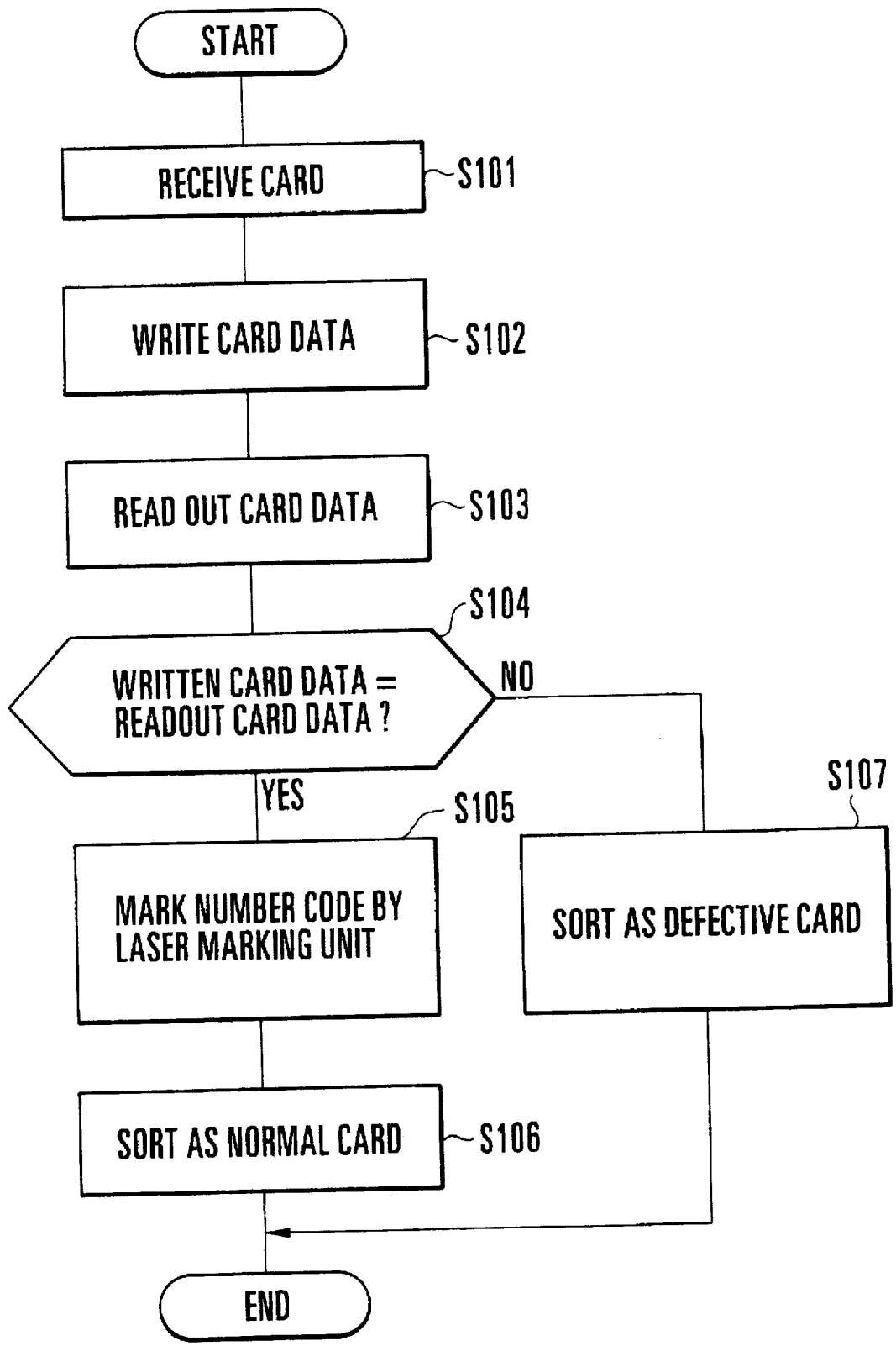
FIG. 2 is a flow chart showing card issuing processing of the card issuing apparatus shown in FIG. 1.

FIG. 2 is a flow chart showing the operation of the card issuing apparatus 102. The operation of the main part of the present invention will be described in detail with reference to this flow chart.

The number of cards to be issued to belong each of the lots per day, the number codes assigned to the cards, and value information are transmitted from the operation unit 107. When nonrecorded cards are detected to be supplied to the nonrecorded card accumulation unit 104, the control unit 106 instructs the card reception unit 131 to receive the nonrecorded cards accumulated in the nonrecorded card accumulation unit 104. By this instruction, the card reception unit 131 sequentially receives the nonrecorded cards one by one (step S101). Each card received by the card reception unit 131 is conveyed to the recording/reproducing unit 132 through a card convey path (not shown).

In this case, card data consisting of value information and the number code data including the serial number is magnetically recorded on the magnetic tracks 111a and 111b (FIG. 4) of the conveyed nonrecorded card on the basis of the instruction from the control unit 106 (step S102). The card data recorded on the magnetic tracks 111a and 111b is read out (step S103). The determination unit 106a in the control unit 106 determines whether the readout serial number data coincides with the written serial number data (step S104).

If the readout serial number data coincides with the written serial number data, the control unit 106 controls the laser marking unit 134 to mark the number code in the number code printing portion 113 of the card with a laser beam (step S105). At the same time, the serial number for the card conveyed next is incremented by one. The card marked with the number code including the serial number is sorted as a normal card to the cassette supply unit 105 through the selector 135 (step S106).

Since the number code recorded on the card with a laser beam is not printed by an ink-jet printer used in the conventional case, the recorded number will not be scratchy or blot. In addition, even if the card surface is brought into frictional contact, the number is kept readable. The intensity of the laser beam is adjusted not to damage the card, thereby clearly marking the number code on the card.

When the serial number data read out from the magnetic tracks 111a and 111b does not coincide with the serial number data obtained before they are magnetically recorded on the magnetic tracks 111a and 111b, the control unit 106 drives the selector 133 to sort this card as a defective card to the defective card cassette 136 (step S107).

Figure 3A:
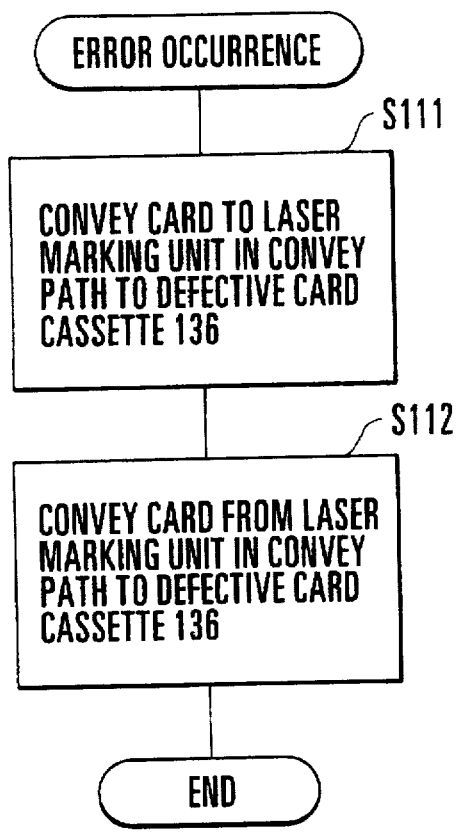
FIGS. 3A and 3B are flow charts showing card issuing error processing and additional printing processing of the card issuing apparatus shown in FIG. 1.

FIG. 3A is a flow chart showing the processing operations upon occurrence of an error during card issuance. As described above, when the first error caused by incoincidence between the readout card data and the written card data occurs, card conveyance is stopped. In this case, in step S111, the control unit 106 controls the selector 133 to sort this card to the defective card cassette 136.

When the detection unit 106b in the control unit 106 detects the second error caused by a card jam in the card convey path until the card is delivered to the cassette supply unit 105 after the number code is marked with the laser beam, card conveyance is stopped. In this case, in step S112, the control unit 106 causes the selector 135 to sort the card to the defective card cassette 137.

In occurrence of the first and second errors, the number codes including the serial numbers are already magnetically recorded or marked with the laser beam on the defective cards. When a number code including the next serial number is recorded on a nonrecorded card conveyed next, the serial number of the defective card becomes a missing number, which is not preferable in view of card management. The control unit 106 controls that the number code including the serial number next to the serial number assigned to the last card normally issued and kept in the cassette supply unit 105 is recorded on a newly conveyed nonrecorded card. That is, the serial number once assigned to the defective card is assigned again to the newly conveyed nonrecorded card.

As described above, the number codes including the serial numbers without any missing number are magnetically recorded and marked with the laser beam on the cards normally issued and kept in the cassette supply unit 105. The magnetically recorded information is erased from the magnetic tracks 111a and 111b of the defective card sorted to the defective card cassette 136 upon detection of the incoincidence between the readout card data and the written card data. This defective card can be used again as a nonrecorded card.

An inspector visually checks the preprinted pattern on the upper surface and scratches on the lower surface of the card normally issued and kept in the cassette supply unit 105. Only the acceptable cards are delivered on the market. In this case, even if a missing number is eliminated from the serial numbers in the card issuing processing, determination of a defective card in visual inspection of the outer appearance of the card causes a missing number in the serial numbers. To eliminate any missing number in the serial numbers of the cards delivered on the market, the serial numbers of the defective cards must be recorded on supplementary nonrecorded cards, i.e., additional printing must be performed.

Figure 3B:
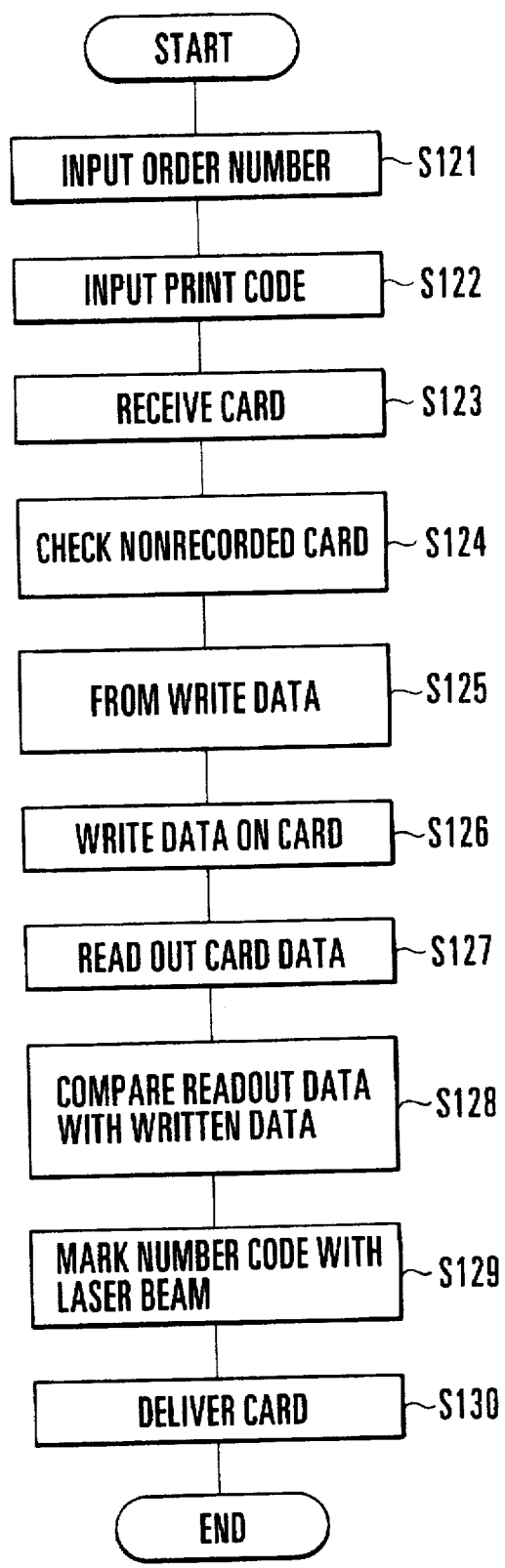

FIG. 3B is a flow chart showing the operation of the card issuing apparatus in the above-mentioned additional printing processing. The operator inputs an order number representing a lot number at the operation unit 107 (step S121). The operator also inputs the serial numbers of the defective cards determined as defective in the visual inspection at the operation unit 107 (step S122). These pieces of information are transmitted to the control unit 106.

The control unit 106 controls the card reception unit 131 to receive nonrecorded cards (step S123) to check if the nonrecorded cards are authentic cards (step S124). For example, a bar code having a predetermined pattern which cannot be visually observed but is recorded in advance at the positions of the magnetic tracks 111a and 111b is read from the nonrecorded card with an optical sensor (not shown) to check whether this card is an authentic card. Note that in card issuing processing in an order of serial numbers, the nonrecorded card check processing need not be performed because the nonrecorded cards are compensated for a loss in the lot. However, in additional printing processing, nonrecorded card check processing is performed in step S124 because reliability of the nonrecorded card is not perfect.

When this nonrecorded card is determined as normal, the control unit 106 forms write data consisting of value information and a number code including a serial number for magnetic recording on this card and supplies the formed data to the recording/reproducing unit 132 (step S125). The recording/reproducing unit 132 magnetically records this write data on the magnetic tracks 111a and 111b of the nonrecorded card (step S126) and at the same time reads out the magnetically recorded data (step S127). The control unit 106 compares the readout data with the written data (step S128).

When the readout data coincides with the written data, the control unit 106 controls the laser marking unit 134 to mark the number code including the serial number on the card (step S129). As a result, the card marked with the number code including the serial number is delivered to the cassette supply unit 105 (step S130). As described above, when a card is checked as a defective card upon inspection of its outer appearance, a new card is additionally printed and issued in place of this defective card. Note that cards as additional printing processing objects are limited to the cards issued each day in this embodiment.

In the above embodiment, comparison between the readout data and the written data is performed using the number codes. However, comparison may be performed using both the value information and the number codes.

As has been described above, according to the present invention, since the number code of the card is not printed by an ink-jet printer, the recorded number will not be scratchy or blot. Even if the card is brought into frictional contact, the number is kept readable. Therefore, card management efficiency in managing the cards using the number codes including the serial numbers can be improved.

In issuing a card, the bar code read operation required in the conventional case need not be performed. The bar code read error can be eliminated, and the decrease in yield in card issuance can be prevented.

When the number code read out from the card upon magnetic recording coincides with the number code obtained before magnetic recording, the number code is marked with a laser beam. A card can be issued as an appropriate normal card in which the two number codes described above coincide with each other.

When the number code read out from the card upon magnetic recording does not coincide with the number code obtained before magnetic recording, or the card marked with the number code cannot be normally delivered, the number code including the serial number next to the last card normally marked with the number code and normally delivered is assigned to a newly conveyed card. For this reason, the serial numbers without any missing number can be assigned to the issued cards. Therefore, the card management efficiency can be improved.

What is claimed is:

1. A card comprising:

a magnetic track portion on which value information representing a prepaid amount and one of serial number data consecutively assigned in an issuance order are magnetically recorded; and a serial number printing portion in which a number representing the serial number data is marked with a laser beam, wherein said magnetic track portion and said serial number printing portion are formed in different areas of said card.

2. A card according to claim 1, wherein said magnetic track portion and said serial number printing portion are formed on the same surface of said card.

3. A card issuing apparatus comprising:

a recording/reproducing means for magnetically recording value information representing a prepaid amount and one of serial number data consecutively assigned in an issuance order in a first area of said card, and reading out the serial number data magnetically recorded in the first area; and laser marking means for marking a number represented by the serial number data read out by said recording/reproducing means in a second area of said card with a laser beam; and determination means for determining whether the serial number data recorded by said recording/reproducing means coincides with the serial number data read out by said recording/reproducing means, so that said determination means enables said laser marking means when the recorded serial number data coincides with their readout serial number data;

wherein the first and second areas are respectively constituted by a magnetic track portion and a serial number printing portion which are respectively formed in predetermined areas of said card.

4. An apparatus according to claim 3, further comprising detection means for detecting a card jam of a card marked with a serial number by said laser marking means, and control means for incrementing a serial number by one upon issuance of each card and assigning a next serial number, and performing error processing to deliver a card having an error as a defective card when one of a determination output representing an incoincidence between the two serial number data from said determination means and a detection output representing the card jam from said detection means is obtained, so that said control means assigns a serial number next to the serial number of a card issued last prior to the error processing to a card to be issued first upon the error processing.

5. An apparatus according to claim 4, further comprising input means for inputting card issuing information, so that said control means controls card issuance on the basis of the card issuing information input from said input means.

* * * * *